(12) United States Patent
Steenwyk et al.

(10) Patent No.: US 6,244,716 B1
(45) Date of Patent: Jun. 12, 2001

(54) EXTERIOR MIRROR SUB-ASSEMBLY WITH COMBINED ELECTRONIC CIRCUITRY AND MIRROR ELEMENT

(75) Inventors: Timothy E. Steenwyk, Jenison; Robert C. Knapp, Coloma, both of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/312,682

(22) Filed: May 17, 1999

(51) Int. Cl.[7] .................................................. G02B 5/08
(52) U.S. Cl. ............................ 359/603; 359/604; 359/601; 359/265; 359/273
(58) Field of Search ............................... 359/603, 604, 359/601, 265–268, 273; 362/83.1

(56) References Cited

U.S. PATENT DOCUMENTS

| | | | |
|---|---|---|---|
| 5,393,604 | * 2/1995 | Sanchez | 428/324 |
| 5,424,989 | 6/1995 | Larson et al. | 361/101 |
| 5,448,397 | 9/1995 | Tonar | 359/272 |
| 5,572,354 | * 11/1996 | Desmond et al. | 359/265 |
| 5,669,698 | * 9/1997 | Veldman et al. | 362/83.1 |
| 5,669,705 | 9/1997 | Pastrick et al. | 362/83.1 |
| 5,760,962 | 6/1998 | Schofield et al. | 359/604 |
| 5,798,575 | 8/1998 | O'Farrell et al. | 307/10.1 |
| 5,808,777 | 9/1998 | Lynam et al. | 359/265 |
| 5,818,650 | 10/1998 | Nyhof et al. | 359/876 |
| 5,864,642 | * 1/1999 | Chun et al. | 385/14 |
| 5,871,275 | 2/1999 | O'Farrell et al. | 362/494 |
| 5,877,897 | 3/1999 | Schofield et al. | 359/604 |

FOREIGN PATENT DOCUMENTS

WO 0030893    6/2000    (WO).

\* cited by examiner

*Primary Examiner*—Mohammad Sikder
(74) *Attorney, Agent, or Firm*—Price, Heneveld, Cooper, DeWitt & Litton; Brian J. Rees

(57) ABSTRACT

A simplified mirror sub-assembly for exterior automotive mirrors includes an electrochromic mirror element, a circuit board disposed on a rear surface of the mirror element, and a carrier plate attached to the circuit board via double-sided adhesive tape. The sub-assembly may include a conductive trace disposed on the surface of the circuit board that mates with the mirror element to dissipate heat generated by electronic components on the circuit board and act as a heater for the mirror element at the same time. The electronic components on the circuit board are arranged to lie in a void created by a peripheral edge in the carrier plate so that the inventive structure can incorporate a known carrier plate structure, if desired, to allow easy installation into a known mirror housing.

46 Claims, 3 Drawing Sheets

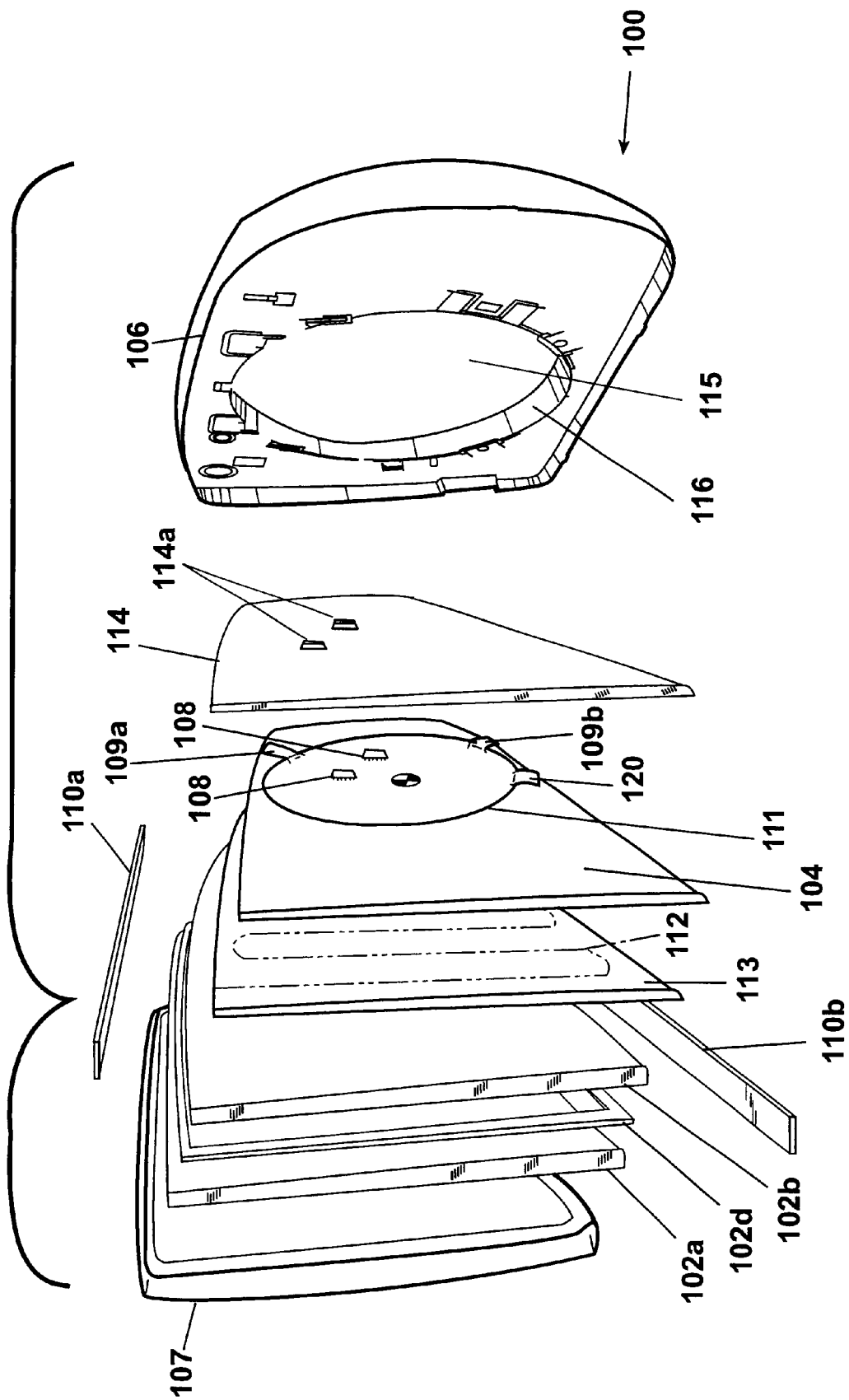

EXTERIOR MIRROR SUB-ASSEMBLY WITH COMBINED ELECTRONIC CIRCUITRY AND MIRROR ELEMENT

TECHNICAL FIELD

The present invention is directed to the field of exterior automotive mirrors, and more particularly to an exterior mirror sub-assembly having integrated control circuitry.

BACKGROUND ART

An exterior mirror assembly for automobiles typically includes a mirror sub-assembly with a carrier plate that holds an exterior mirror and also movably connects the mirror subassembly to other parts of the exterior mirror assembly such as an exterior mirror housing and a motor pack. Historically, exterior mirror structures usually did not include any electronic circuitry or other added features that enhance the functions of the mirror or the automobile. Such enhanced features as there were, often were driven remotely by electronic circuitry in the body of the vehicle. Recently, however, it is common to add electronic circuitry to the exterior mirror assembly to provide enhanced features, such as antennas, security lights, signal modules, heaters, electrochromic mirror elements, light sensors, and the like. For some of these enhanced features on exterior mirrors, the carrier plate provides a convenient structural support for the electronic components as well as the mirror itself in the mirror sub-assembly. Heretofore, such electronic components have been mounted on a discrete circuit board on the carrier plate and covered for protection against environmental contamination.

One problem with such mountings is that sufficient volume must be maintained in the mounting to dissipate heat generated by the circuitry. The corresponding volume consumes excessive space within the mirror housing and creates a protrusion from the rear of the carrier plate with a resultant uneven profile extending rearwardly of the carrier plate. For example, in a mirror assembly having a heater to remove ice or mist from the mirror glass, the heater is attached to a front side of the carrier plate on its own heater substrate, adjacent to the mirror glass. The motor pack, an electronic circuit board, and assorted electrical connectors between the circuit board and the heater and motor pack are mounted to the rear of the carrier plate. With this arrangement, the sub-assembly has a relatively high, uneven profile, requiring additional space in the housing to accommodate the motor pack and the limits of motion of the mirror subassembly. This profile will also interfere or displace other electronic components in the mirror housing.

Additionally, because exterior mirrors come in a wide variety of shapes, dimensions, and radii of curvature, the uneven profile caused by the differing electronic circuitry necessitates a custom-designed carrier plate for different vehicles.

SUMMARY OF THE INVENTION

An exterior automotive mirror sub-assembly according to the present invention includes a mirror element, a circuit board, and a carrier plate, wherein the circuit board is disposed in between the carrier plate and the mirror element. More particularly, the inventive structure arranges the electronic components on the circuit board such that they are disposed in space that already exists between the carrier plate and the mirror element. One possible structure includes surface-mounted electronic components placed on a flexible circuit board so that the components lie within a void typically located on the carrier plate and associated with the mounting of a motor pack. As a result, the carrier plate can be designed for near universal mounting in a variety of applications.

In one embodiment, the circuit board has a conductive track on the surface adjacent to the mirror element and electronic components on the surface opposite the mirror element. When the circuit board and the conductive track are in contact with the mirror element, the conductive track serves as a heater for the mirror element and also allows the mirror element to act as a heat sink at the same time. As a result, the inventive structure eliminates the need for providing a separate heater substrate to carry the heater.

The circuit board itself can be a flexible circuit board, which provides the lowest profile, or a rigid circuit board. The circuit board may also have protrusions for connecting the circuit board to bus bars in the mirror element or making other electrical connections, eliminating the need for soldered wire connections. One of the protrusions can be dedicated to external connections. Double-sided adhesive tape can be used to attach the circuit board and carrier plate together and can contain voids, in the form of indentations or holes, to accommodate taller electronic components.

By placing the carrier plate over the circuit board rather than beneath it and by placing the components in space that already exists between the carrier plate and the circuit board, the rear profile of the sub-assembly can be preserved to allow easy installation of the sub-assembly into the mirror housing using known components. Further, the inventive structure has a relatively low, thin profile, minimizing the amount of space that the sub-assembly occupies within the mirror housing.

Other objects, features, and advantages of the invention will be apparent from the ensuing description in conjunction with the accompanying drawings.

BRIEF DESCRIPTION OF THE DRAWINGS

In the drawings:

FIG. 4 is an exploded view of the mirror sub-assembly of FIG. 1.

DETAILED DESCRIPTION OF THE PREFERRED EMBODIMENTS

Figure 1:
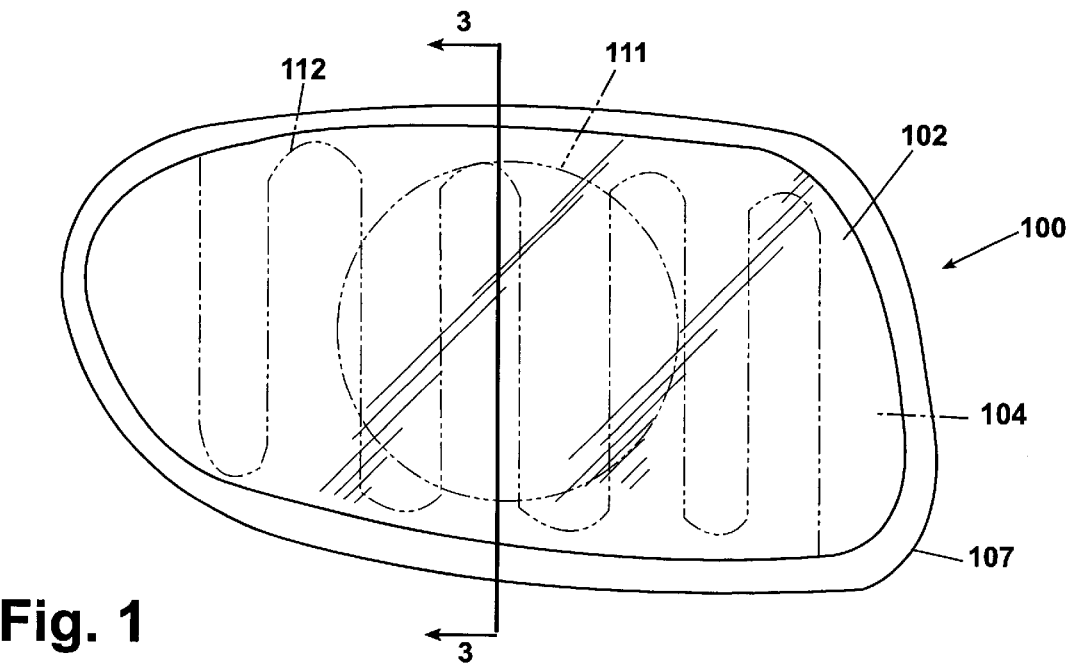
FIG. 1 is a front view of a mirror sub-assembly according to one embodiment of the present invention.

FIGS. 1 through 4 illustrate an embodiment of a mirror sub-assembly 100 of the present invention. In its most basic form, the mirror sub-assembly includes a mirror element 102, a circuit board 104, a carrier plate 106, and a bezel 107 with the circuit board 104 disposed between the mirror element 102 and the carrier plate 106. The sub-assembly can be held together by a snap fit connection between the bezel 107 and the carrier plate 106, or the bezel 107 can be potted to the mirror element 102 which is, in turn, adhered to the carrier plate 106. The mirror element 102 can be made of glass or any other material or material combination used for exterior mirrors. The mirror element 102 used in the inventive structure can have any contour, including flat, aspheric, or convex, depending on the type of reflection desired. In addition, the mirror element 102 can be an electrochromic mirror made from two pieces of glass 102a, 102a with an electrochromic medium 102c disposed therebetween and confined with a seal 102d, which is the preferred embodiment. For purposes of illustration only, the invention will be described with respect to an electrochromic mirror element 102.

Figure 2:
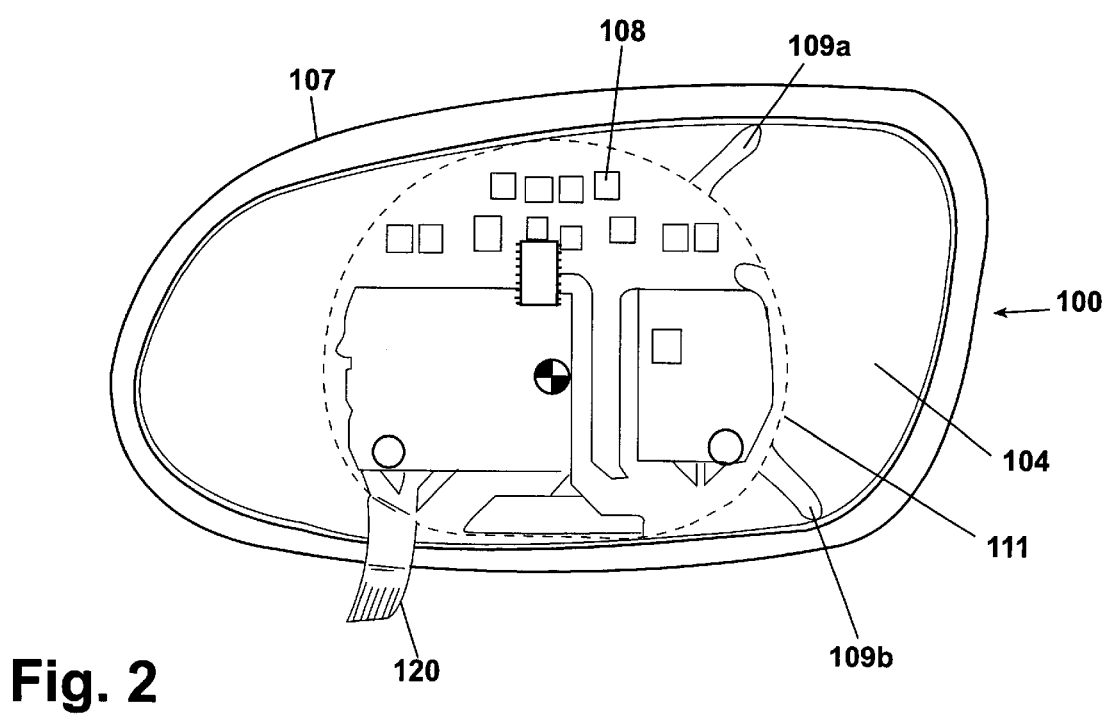
FIG. 2 is a rear view of the mirror sub-assembly of FIG. 1 with the carrier plate removed.
Figure 3:
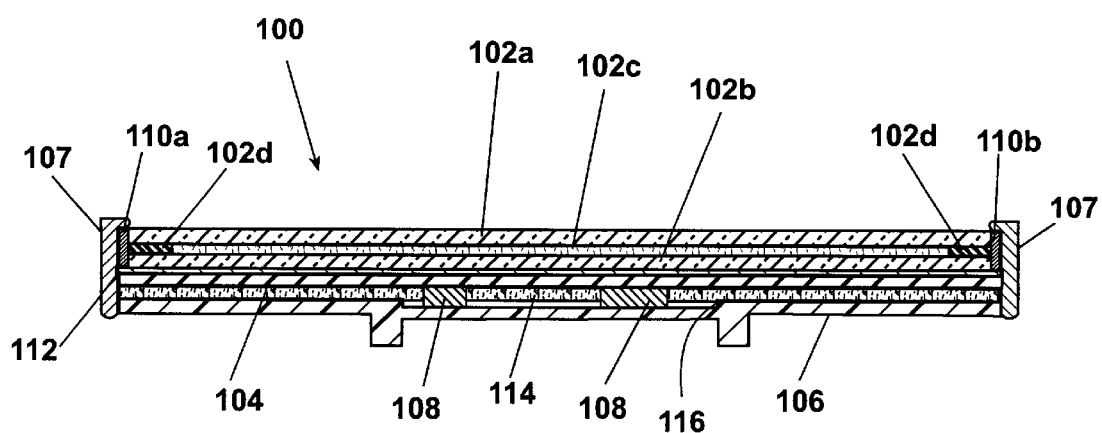
FIG. 3 is a cross-sectional view of the mirror sub-assembly of FIG. 1 taken along line 3—3.

The circuit board 104 can be either a flexible circuit board or a rigid circuit board. A flexible circuit board 104 having surface mounted electronic components 108, often referred to as a printed circuit board, is illustrated in FIGS. 2 through 4 and is preferred because of its thinness, thereby reducing the vertical profile of the mirror sub-assembly 100 and minimizing the amount of space that the sub-assembly 100 occupies in a mirror housing. Also, the flexibility of the flexible circuit board 104 allows the board 104 to follow the contours of the mirror element 102 smoothly and ensure good contact between the mating surfaces of the board 104 and the mirror element 102. The circuit board 104 can be a monolithic, unitary structure formed from one type of board material, or it can be made from two or more types of board material bonded or connected together by any known means. The circuit board 104 can be any shape and occupy any portion of the mirror element 102. But, for reasons explained below, the circuit board 104 preferably covers substantially the entire rear surface of the mirror element 102.

Regardless of the specific board material used, the circuit board 104 can have at least one protrusion 120 to connect the circuit board 104 electrically to other components without requiring additional wires or soldered connections. In an embodiment using an electrochromic mirror, as shown in FIG. 4, for example, another protrusion 109a can be connected to a bus bar at 110a on one side of the electrochromic element 102 and protrusion 109b can be connected to a bus bar at 110b on the other side of the electrochromic element 102. Further, because the protrusions 109a and 109b are preferably integral to the circuit board structure 104, the connections between the circuit board 104 and the bus bar 110 or other connector is more reliable and less expensive than wire connections.

The electronic components 108 are preferably arranged on the board so that the mass of the components 108 is near the center of gravity of the mirror subassembly 100 to minimize vibration of the sub-assembly 100 after it is installed into an automobile. The structure of FIG. 2 shows an arrangement where the electronic components 108 are disposed in a zone 111 around the center of the mirror element 102, but other arrangements are acceptable as well.

Although the invention will enable the circuit board 104 to drive a separate heater 113 having a conductive track 112 via protrusion 120 as shown in FIG. 4, the unique configuration of the preferred flexible circuit board 104, which has an area that occupies substantially all of the rear surface of the mirror element 102, enables a heat conductor on the circuit board 104 to allow the mirror element 102 to act as a heat sink for the circuit board 104 and, at the same time, allow the conductor to act as a mirror heater. FIGS. 1 and 3 show the sub-assembly 100 with an optional conductive track 112 that preferably fills most or all of the circuit board 104 surface facing the mirror element 102. The circuit board 104 in this case will therefore have the conductive track 112 on one side and the electronic components 108 on the other side. The larger coverage of the conductive track 112 area provides improved heat distribution over the mirror element 102 and more efficient dissipation of heat from the circuit board 104. The material used to form the conductive track 112 can be metal (e.g. copper), metal alloy, conductive ink, or any other conductive material. If conductive ink having a positive temperature coefficient, such as printed silver ink, is used to form the conductive track 112, a separate thermostat does not need to be provided as an electronic component 108 because the resistance of the ink increases rapidly as its temperature increases, making the conductive track 112 self-limiting. By placing the conductive track 112 directly on the circuit board 104, on the surface opposite the electronic components 108 and in contact with the mirror element 102, the track 112 allows efficient dissipation of heat away from the circuit board 104 and also allows the mirror element 102 to act as a heat sink at the same time. Further, the conductive track 112 acts as a heater for the mirror element 102, improving the elimination of ice and mist from the front surface of the mirror element 102 if necessary. If desired, a thermostat or other heater control can be provided as an electronic component 108 on the circuit board 102 and connected to the conductive track 112 so that the amount of heat flowing through the track 112 can be controlled by, for example, pulse width modulation via a switching mechanism. It is also within the scope of the invention for a microprocessor on the circuit board to provide temperature control internally of the circuitry.

The carrier plate 106 is preferably formed of molded plastic and has a central void 115 defined by a peripheral edge 116. The peripheral edge 116 is provided to accommodate mounting of a motor pack (not shown), disposed adjacent the void 115, which drives rotation of the mirror sub-assembly 100 relative to an exterior mirror housing.

To connect the components of the mirror sub-assembly 100, an adhesive, preferably an adhesive tape or film and more preferably a double-sided foam adhesive tape 114 is provided between the circuit board 104 and the carrier plate 106 and attached over the circuit board 104. Voids 114a, such as indentations or holes, can be cut in the tape 114 to accommodate taller electronic components 108 protruding from the circuit board 114. The carrier plate 106 itself can also contain indentations or voids to allow taller components 108 to protrude into or through the carrier plate.

In a preferred embodiment, as shown in FIGS. 2 through 4, the circuit board 104 covers most or all of the rear surface of the mirror element 102, but the electrical components 108 are clustered closer to the center of the board 104. As can be seen in FIG. 4, this arrangement allows the components 108 to sit within the void 115 of the carrier plate 106 while allowing the conductive track 112 on the other side of the circuit board 104 to cover as much of the mirror element 102 surface as possible. The peripheral edge 116 is located at the motor pack mounting position of the carrier plate 106 and already exists in conventional carrier plate structures. Thus, a conventional carrier plate 106 can be used in the inventive structure. If needed, the peripheral edge 116 can be made thicker to create additional vertical distance for accommodating the electrical components 108 underneath the carrier plate 106.

As a result, the invention is an exterior mirror sub-assembly 100 with electronic circuitry 104, 108 disposed between a mirror element 102 and a carrier plate 106, thereby enabling a carrier plate rear profile for near universal installation. The inventive structure 100 also has a thinner profile to minimize the amount of space the sub-assembly occupies in the mirror housing. One embodiment integrates a heater structure 112 with the circuit board to eliminate the need for a separate heater substrate and to use the mirror element 102 as a heat sink for the circuit 104, 108, simplifying the overall structure and improving heat dissipation.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An exterior automotive mirror sub-assembly, comprising:
   a mirror element having a front surface and a rear surface;
   a circuit board facing the rear surface of the mirror element;
   one or more electronic components disposed on the circuit board; and
   a carrier plate for attaching the mirror element to a motor pack, wherein the circuit board is disposed between the mirror element and the carrier plate, and wherein the carrier plate supports the mirror element and facilitates movement of the mirror element.

2. The exterior automotive mirror sub-assembly of claim 1, wherein the circuit board has a front surface facing the rear surface of the mirror element and a rear surface, wherein the one or more electronic components are disposed on the rear surface of the circuit board, and wherein the carrier plate contains at least one of an indentation and a void to receive at least one of the one or more electronic components.

3. The exterior automotive mirror sub-assembly of claim 2, wherein the mirror element has a profile selected from the group consisting of a flat profile, an aspheric profile, and a convex profile.

4. The exterior automotive mirror sub-assembly of claim 3, wherein the circuit board is disposed on the rear surface of the mirror element.

5. The exterior automotive mirror sub-assembly of claim 4, wherein the circuit board is a flexible printed circuit board.

6. The exterior automotive mirror sub-assembly of claim 4, wherein the flexible printed circuit board has at least one protrusion that can be attached to a bus bar or connector coupled to the mirror element.

7. The exterior automotive mirror sub-assembly of claim 1, wherein the mirror element has a profile selected from the group consisting of a flat profile, an aspheric profile, and a convex profile.

8. The exterior automotive mirror sub-assembly of claim 7, wherein the circuit board is disposed on the rear surface of the mirror element.

9. The exterior automotive mirror sub-assembly of claim 8, wherein the circuit board is a flexible printed circuit board.

10. The exterior automotive mirror sub-assembly of claim 8, wherein the flexible printed circuit board has at least one protrusion that can be attached to a bus bar or connector coupled to the mirror element.

11. The exterior automotive mirror sub-assembly of claim 1, wherein the circuit board is a flexible printed circuit board.

12. The exterior automotive mirror sub-assembly of claim 11, wherein the flexible printed circuit board has at least one protrusion that can be attached to a bus bar or connector coupled to the mirror element.

13. The exterior automotive mirror sub-assembly of claim 1, wherein the circuit board is a rigid printed circuit board.

14. The exterior automotive mirror sub-assembly of claim 13, wherein the rigid circuit board has at least one protrusion that can be attached to a bus bar or connector coupled to the mirror element.

15. The exterior automotive mirror sub-assembly of claim 1, further comprising a heater disposed between the circuit board and the rear surface of the mirror element.

16. The exterior automotive mirror sub-assembly of claim 15, wherein the heater comprises a conductive track disposed on a first surface of the circuit board and in contact with a rear surface of the mirror element.

17. The exterior automotive mirror sub-assembly of claim 16, wherein the conductive track is formed from at least one selected from the group consisting of metal, metal alloy, and conductive ink.

18. The exterior automotive mirror sub-assembly of claim 1, wherein the circuit board is a monolithic printed circuit board.

19. The exterior automotive mirror sub-assembly of claim 1, wherein the circuit board is constructed from at least two types of printed circuit board material that are connected together.

20. The exterior automotive mirror sub-assembly of claim 2, further comprising an adhesive between the second surface of the circuit board and the carrier plate.

21. The exterior automotive mirror sub-assembly of claim 20, wherein the adhesive comprises a double-sided foam adhesive sheet having one or more voids to accommodate the one or more electronic components.

22. The exterior automotive mirror sub-assembly of claim 21, wherein the one or more voids are one or more holes that extend through the adhesive sheet.

23. The exterior automotive mirror sub-assembly of claim 1, wherein the carrier plate has a void defined by a peripheral edge, wherein the one or more electronic components lie within the void defined by the peripheral edge.

24. The exterior automotive mirror sub-assembly of claim 23, wherein the peripheral edge has a thickness that is at least a vertical height of one of the electrical components on the circuit board.

25. An exterior automotive mirror sub-assembly, comprising:
   an electrochromic mirror element having a front surface and a rear surface;
   a flexible circuit board having a front surface facing the rear surface of the mirror element, wherein the front surface of the circuit board is in contact with the rear surface of the mirror element;
   one or more electronic components disposed on the circuit board; and
   a carrier plate for attaching the mirror element to a motor pack, wherein the circuit board is disposed in between the mirror element and the carrier plate, and wherein the carrier plate supports the mirror element and facilitates movement of the mirror element.

26. The exterior automotive mirror sub-assembly of claim 25, wherein the mirror element has a profile selected from the group consisting of a flat profile, an aspheric profile, and a convex profile.

27. The exterior automotive mirror sub-assembly of claim 25, wherein the flexible circuit board has at least one protrusion that can be attached to a bus bar or connector coupled to the mirror element.

28. The exterior automotive mirror sub-assembly of claim 25, further comprising a heater disposed between the circuit board and the rear surface of the mirror element.

29. The exterior automotive mirror sub-assembly of claim 28, wherein the heater comprises a conductive track disposed on a first surface of the circuit board and in contact with a rear surface of the mirror element.

30. The exterior automotive mirror sub-assembly of claim 28, wherein the conductive track is formed from at least one selected from the group consisting of metal, metal alloy, and conductive ink.

31. The exterior automotive mirror sub-assembly of claim 25, wherein the flexible circuit board is a monolithic printed circuit board.

32. The exterior automotive mirror sub-assembly of claim 25, wherein the flexible circuit board is constructed from at least two types of printed circuit board material that are connected together to form the flexible circuit board.

33. The exterior automotive mirror sub-assembly of claim 25, further comprising an adhesive between the second surface of the circuit board and the carrier plate.

34. The exterior automotive mirror sub-assembly of claim 33, wherein the adhesive comprises a double-sided foam adhesive sheet having one or more voids to accommodate one or more electronic components.

35. The exterior automotive mirror sub-assembly of claim 34, wherein the voids are holes that extend through the adhesive sheet.

36. The exterior automotive mirror sub-assembly of claim 25, wherein the carrier plate has a void defined by a peripheral edge, wherein the one or more electronic components lie under the carrier plate within the void defined by the peripheral edge.

37. The exterior automotive mirror sub-assembly of claim 36, wherein the peripheral edge has a thickness that is at least a vertical height of one of the electrical components on the flexible circuit board.

38. The exterior automotive mirror sub-assembly of claim 25, wherein the electronic components are arranged on the flexible circuit board to align with a center of gravity of the mirror sub-assembly.

39. An exterior automotive mirror sub-assembly, comprising:
   an electrochromic mirror element having a front surface and a rear surface and having a profile selected from the group consisting of a flat profile, an aspheric profile, and a convex profile;
   a flexible circuit board having a first surface facing the mirror element and a second surface;
   a conductive track disposed on the first surface of the flexible circuit board to form a heater, wherein the first surface of the flexible circuit board and the conductive track contact the rear surface of the mirror element;
   a plurality of electronic components disposed on the flexible circuit board; and
   a carrier plate attached to the electrochromic mirror element by an adhesive, the carrier plate having a void defined by a peripheral edge, wherein the one or more electronic components lie under the carrier plate within the void defined by the peripheral edge.

40. The exterior automotive mirror sub-assembly of claim 39, wherein the adhesive comprises a double-sided foam adhesive sheet having one or more voids to accommodate one or more of the plurality of electronic components.

41. The exterior automotive mirror sub-assembly of claim 40, wherein the voids are holes that extend through the adhesive sheet.

42. The exterior automotive mirror assembly of claim 39, wherein the peripheral edge on the carrier plate has a thickness that is at least a vertical height of one of the electrical components on the circuit board.

43. The exterior automotive mirror sub-assembly of claim 39, wherein the electronic components are arranged on the flexible circuit board to align with a center of gravity of the mirror sub-assembly.

44. The exterior automotive mirror sub-assembly of claim 25, wherein at least one of the one or more electronic components is disposed on a rear surface of the flexible circuit board, and wherein the carrier plate contains at least one of an indentation and a void to receive the at least one electronic component.

45. An exterior automotive mirror sub-assembly, comprising:
   a mirror element having a front surface and a rear surface;
   a circuit board facing the rear surface of the mirror element;
   one or more electronic components disposed on the circuit board; and
   a carrier plate attaching the mirror element to a motor pack, wherein the circuit board is disposed between the mirror element and the carrier plate, and wherein the carrier plate supports the mirror element and facilitates movement of the mirror element, the carrier plate including a central void with a peripheral edge to accommodate attachment of the motor pack.

46. An exterior automotive mirror sub-assembly, comprising:
   an electrochromic mirror element having a front surface and a rear surface;
   a flexible circuit board having a front surface facing the rear surface of the mirror element, wherein the front surface of the circuit board is in contact with the rear surface of the mirror element;
   one or more electronic components disposed on the circuit board; and
   a carrier plate attaching the mirror element to a motor pack, wherein the circuit board is disposed in between the mirror element and the carrier plate, and wherein the carrier plate supports the mirror element and facilitates movement of the mirror element, the carrier plate including a central void with a peripheral edge to accommodate attachment of the motor pack.

* * * * *